United States Patent
Dargahi et al.

(10) Patent No.: US 10,110,528 B2
(45) Date of Patent: *Oct. 23, 2018

(54) SYSTEM AND METHOD FOR ENABLING AN EXTERNAL-SYSTEM VIEW OF EMAIL ATTACHMENTS

(71) Applicant: VMware, Inc., Palo Alto, CA (US)

(72) Inventors: Ross Dargahi, Mountain View, CA (US); Roland J. Schemers, III, Emerald Hills, CA (US); Satish Dharmaraj, Saratoga, CA (US)

(73) Assignee: VMware, Inc., Palo Alto, CA (US)

( * ) Notice: Subject to any disclaimer, the term of this patent is extended or adjusted under 35 U.S.C. 154(b) by 496 days.

This patent is subject to a terminal disclaimer.

(21) Appl. No.: 14/458,146

(22) Filed: Aug. 12, 2014

(65) Prior Publication Data

US 2014/0351714 A1 Nov. 27, 2014

Related U.S. Application Data

(63) Continuation of application No. 11/128,558, filed on May 14, 2005, now Pat. No. 8,805,934.

(Continued)

(51) Int. Cl.
*G06F 15/16* (2006.01)
*H04L 12/58* (2006.01)
(Continued)

(52) U.S. Cl.
CPC ............ *H04L 51/08* (2013.01); *G06F 3/0482* (2013.01); *G06F 17/30598* (2013.01); *G06F 17/30997* (2013.01); *G06Q 10/107* (2013.01)

(58) Field of Classification Search
CPC ....................................................... H04L 51/08
See application file for complete search history.

(56) References Cited

U.S. PATENT DOCUMENTS 5,706,502 A 1/1998 Foley et al.
5,794,039 A 8/1998 Guck
(Continued)

FOREIGN PATENT DOCUMENTS

JP 2000112841 A 4/2000
JP 2002082887 A 3/2002

*Primary Examiner* — Hua Fan
(74) *Attorney, Agent, or Firm* — Fish & Richardson P.C.

(57) ABSTRACT

A method and email application enable email attachments to be viewed through a system external to the email application itself in accordance with select categories. The email application creates categories and categorizes the email attachments according to such categories. The email application then maps the categories into a format understandable by the external system for category information and provides the mapped categories to the external system in such format. In response to receiving a request from the external system for the contents of one of the mapped categories and in response to such category having no further subcategories, the email application identifies the email attachments under such category and maps the identified email attachments to file names. The file names are then provided to the external system as the contents of such category. If the external system requests the contents of a category that has further subcategories, the email application maps the subcategories into a format understandable to the external system and provides such subcategories to the external system as the contents of such category.

The present invention can be used to provide a file-system view of email attachments. In such case, the email application appears as a file system to the operating system of an email user's computer. The created categories are provided to the operating system as the "folders" in the file system. The email attachments are provided as files within such folders.

19 Claims, 13 Drawing Sheets

Related U.S. Application Data

(60) Provisional application No. 60/606,862, filed on Sep. 2, 2004, provisional application No. 60/662,986, filed on Mar. 18, 2005.

(51) Int. Cl.
*G06F 17/30* (2006.01)
*G06Q 10/10* (2012.01)
*G06F 3/0482* (2013.01)

(56) References Cited

U.S. PATENT DOCUMENTS

| | | | |
|---|---|---|---|
| 5,838,916 | A | 11/1998 | Domenikos et al. |
| 6,330,572 | B1 | 12/2001 | Sitka |
| 6,356,937 | B1 | 3/2002 | Montville et al. |
| 6,480,711 | B1 | 11/2002 | Guedalia |
| 6,651,087 | B1 | 11/2003 | Dennis |
| 6,708,205 | B2 | 3/2004 | Sheldon et al. |
| 6,732,111 | B2 | 5/2004 | Brodersen et al. |
| 6,735,623 | B1 | 5/2004 | Prust |
| 6,816,885 | B1 | 11/2004 | Raghunandan |
| 6,952,724 | B2 | 10/2005 | Prust |
| 7,054,905 | B1 | 5/2006 | Hanna et al. |
| 7,113,948 | B2 | 9/2006 | Jhingan et al. |
| 2001/0011350 | A1 | 8/2001 | Zabetian |
| 2001/0047389 | A1 | 11/2001 | Prahlad et al. |
| 2001/0054073 | A1 | 12/2001 | Ruppert et al. |
| 2002/0124057 | A1 | 9/2002 | Besprosvan |
| 2002/0169840 | A1 | 11/2002 | Sheldon et al. |
| 2003/0005065 | A1 | 1/2003 | Lin et al. |
| 2003/0041112 | A1 | 2/2003 | Tada et al. |
| 2003/0097361 | A1 | 5/2003 | Huang et al. |
| 2003/0187937 | A1 | 10/2003 | Yao et al. |
| 2003/0236763 | A1 | 12/2003 | Kilduff |
| 2004/0064473 | A1 | 4/2004 | Thomas et al. |
| 2004/0068545 | A1* | 4/2004 | Daniell .............. H04L 51/00 709/206 |
| 2004/0078375 | A1 | 4/2004 | Johnson |
| 2004/0177319 | A1 | 9/2004 | Horn |
| 2005/0044183 | A1 | 2/2005 | Meunier et al. |
| 2005/0060638 | A1 | 3/2005 | Mathew et al. |
| 2005/0076110 | A1 | 4/2005 | Mathew et al. |
| 2005/0160107 | A1 | 7/2005 | Liang |
| 2005/0188026 | A1* | 8/2005 | Hilbert .............. H04L 12/58 709/206 |
| 2005/0188044 | A1 | 8/2005 | Fleming, III |
| 2006/0010213 | A1 | 1/2006 | Mehta |
| 2006/0036568 | A1 | 2/2006 | Moore et al. |
| 2006/0184540 | A1 | 8/2006 | Kung et al. |
| 2006/0224526 | A1 | 10/2006 | Klug |
| 2007/0021996 | A1 | 1/2007 | Barnard et al. |
| 2007/0174310 | A1 | 7/2007 | Arrouye et al. |
| 2007/0179945 | A1 | 8/2007 | Marston et al. |

\* cited by examiner ized email users. A user accesses his mailbox information through a client application that communicates with the server running the email application. Email clients (referred to herein as the "email client") can be software like Microsoft Outlook or JavaScript downloaded into a web browser.

SYSTEM AND METHOD FOR ENABLING AN EXTERNAL-SYSTEM VIEW OF EMAIL ATTACHMENTS

RELATED APPLICATIONS

This application is a Continuation of U.S. patent application Ser. No. 11/128,558 filed May 14, 2005, issued as U.S. Pat. No. 8,805,934, which claims the benefit of U.S. Provisional Application No. 60/606,862, filed Sep. 2, 2004, and titled "Email System and Method for Viewing, Searching, Tracking, and Indexing Email," and also claims the benefit of U.S. Provisional Application No. 60/662,986, filed on Mar. 18, 2005, and titled "System and Method for Enabling an External-System View of Email Attachments," which are incorporated by reference as if fully disclosed herein.

BACKGROUND OF THE INVENTION

1. Field of the Invention

This invention relates generally to email applications and more specifically to a system and method for categorizing email attachments and for providing an external system view of email attachments in accordance with such categories.

2. Description of the Background Art

Electronic mail ("email") is an important communication medium. It is becoming one of the most common ways for people to share files, such as text documents, digital photos, video files, graphics files, and music files, where such files are sent as attachments to email messages. Consequently, there is a wealth of information stored in individuals' email accounts.

Unfortunately, the only way for email users to access this information is through their email accounts. Moreover, email attachment information is relatively unorganized in known email systems, as such systems do not enable email attachments to be organized and viewed separately from email messages themselves.

Therefore, it is desirable to have an email application that enables email attachments to be more easily viewed and accessed by categorizing email attachments and enabling the email attachments and corresponding categories to be viewed and accessed through an external system.

SUMMARY OF THE INVENTION

The present invention enables email attachments to be viewed through a system external to the email application itself (referred to herein as an "external system") in accordance with select categories. In one embodiment, this method is implemented by email server software (referred to herein as the "email application") that stores and processes email messages and related mailbox information for authorized email users. A user accesses his mailbox information through a client application that communicates with the server running the email application. Email clients (referred to herein as the "email client") can be software like Microsoft Outlook or JavaScript downloaded into a web browser.

In the present invention, the email application creates categories upon which to categorize email attachments in the email system. In one embodiment, these categories correspond to the fields and terms of the metadata in the headers of email messages having email attachments. Some categories may also correspond to user-created tags.

The email application categorizes the email attachments according to the created categories. One way in which this can be done is by indexing email attachments according to the fields and terms of the metadata, but the invention is not limited to this way.

To enable an external-system view of email attachments, the email application maps the categories into a format understandable by the external system for category information and provides the mapped categories to the email system in such format. In response to receiving a request from the external system for the contents of one of the mapped categories and in response to such category having no further subcategories, the email application identifies the email attachments under such category and maps the identified email attachments to file names. The file names are then provided to the external system as the contents of such category. If the external system requests the contents of a category that has further subcategories, the email application maps the subcategories into a format understandable to the external system and provides such subcategories to the external system as the contents of such category.

The present invention can be used to provide a file-system view of email attachments. In such case, the email application appears as a file system to the operating system of the email user's computer. The created categories are provided to the operating system as the "folders" in the file system. The email attachments are provided as files within such folders.

DETAILED DESCRIPTION OF THE PREFERRED EMBODIMENTS

1. General Method for Enabling an External-System View of Email Attachments

Figure 1:
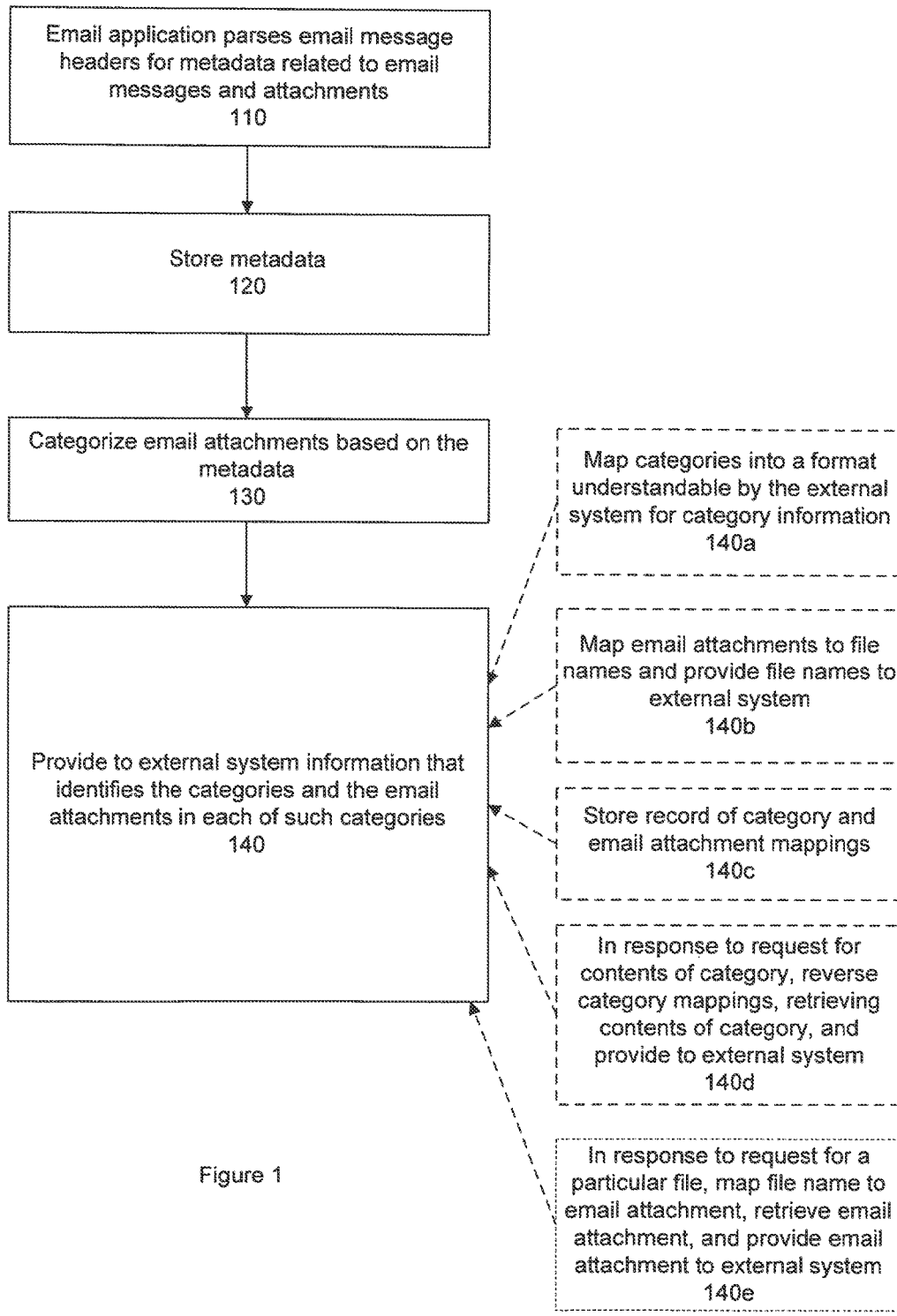
FIG. 1 illustrates a method for enabling email attachment to be categorized and then viewed through a system external to the email application in accordance with such categories.

FIG. 1 illustrates a method, according to one embodiment of the present invention, for categorizing email messages and for enabling email attachments to be viewed through a system external to the email application itself (referred to herein as an "external system") in accordance with such categories. In one embodiment, this method is implemented by email server software (referred to herein as the "email application") that stores and processes email messages and related mailbox information for authorized email users (authorized email users are sometimes referred to as "provisioned email users"). The email application typically runs on a server, and a user accesses his mailbox information through a client application that communications with the server running the email application. Email clients (referred to herein as the "email client") can be software like Microsoft Outlook or JavaScript downloaded into a web browser.

Referring to FIG. 1, when the email application receives an email message with an attachment for an authorized user, it parses 110 the email message header for data related to the email message and the attachment. This data in the header is generally referred to as "metadata" in the industry. The metadata may include information about the attachment itself, such as the type and size of attachment, and information about the email message in which the attachment was imbedded, such as the sender of the email message, the recipient(s) of the email message, and the date of the email message.

For each email attachment received, the email application stores 120 the metadata corresponding to such attachment and the related email message in association with information that uniquely identifies the email attachment and enables the email attachment to be retrieved from storage. In one embodiment, this information is a message ID and message part number. In this embodiment, email attachments are stored as a "part" of an email message. Each email message is assigned a unique message ID, and each email attachment is assigned a part number. For instance, if an email message has two attachments that are stored as the second and third part of the message, then one attachment would be assigned "part number 2" and the other would be assigned "part number 3," as applicable. The actual attachment and related email message are stored in a storage device accessible to the email application.

The email application categorizes 130 the email attachments into one or more select categories based on the metadata. The metadata categories reflect the type of metadata received (e.g., email recipient, email sender, email date, attachment type, attachment size, etc.). The categorization process may take place before, after, or at the same time that the metadata information is stored.

In one embodiment categorizing email attachments by the metadata entails indexing the email attachments by the "fields" and "terms" of the metadata. Examples of metadata "fields" in an email header are "From," "To," "cc," "date," "Subject," "Content-Type," and "Size," The "terms" of the metadata are the values of the fields. For instance, in an email addressed to "john@abccorp.com," the term associated with the field "To" in the metadata for such email is "john@abccorp.com."

Categories that are based on the fields and terms of the metadata are hierarchical in that the fields correspond to the highest-level categories and the terms under each field correspond to subcategories under such field.

Email attachments may also be categorized by user-created categories. For instance, lithe email application enables the user to create tags for email messages, email attachments in tagged messages can be categorized by such tags.

When it is desirable to enable an external-system view of email attachments in accordance with the categories, the email application provides 140 to the external system information that identifies the categories and the email attachments in each of the categories. More specifically, the email application maps 140*a* the categories into a format understandable by the external system for category information, and, for each of the categories with no further subcategories, the email application maps 140*b* each of the email attachments in such category to a file name, which is provided to the external system in a format understandable by the external system. The email application stores 140*c* a record of the mappings, and, thus, when the external system requests the contents of a particular category, the email application is able to reverse map 140*d* the requested category to a format applicable to the email application and then provide the external system with the contents of such category. Such contents are either (i) further subcategories or (ii) file names that correspond to email attachments in the requested category. When the external system requests a particular file by the file name, the email system is able to map 140*e* the file name to an email attachment, retrieve the email attachment, and send it to the external system.

The external system can be any system or software application capable of handling file information. For instance, the external system may be a web server that serves up web pages with file information, or it may be the operating system on an email user's computer.

2. Example: File-System View of Email Attachments

The above-described method can be used to provide a file-system view of email attachments. In such case, the email application appears as a file system to an email user's operating system. The operating system is on a client computer which communicates with the server running the email application via a network (e.g., the Internet or an Intranet)

Figure 2A:
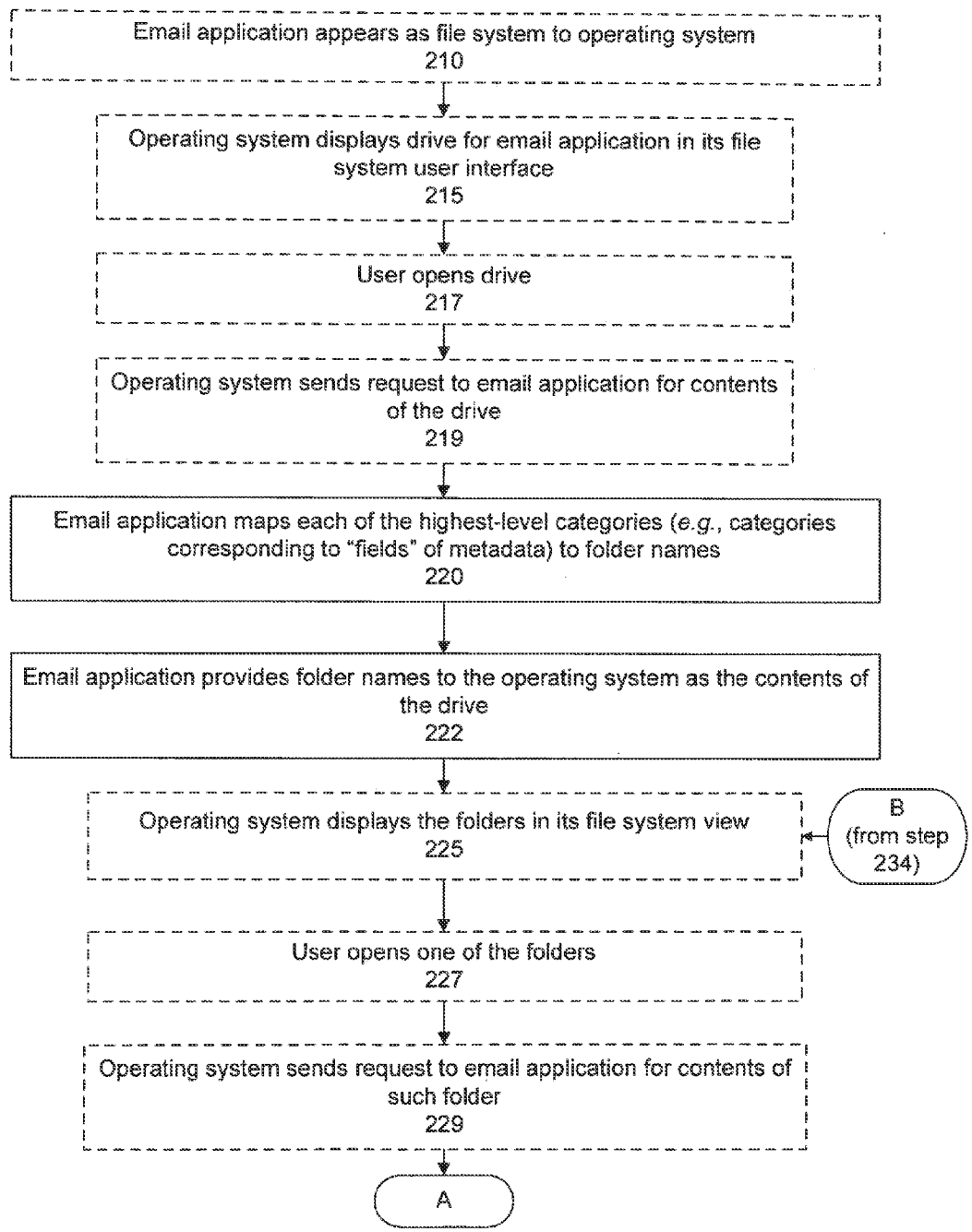
FIGS. 2*a-b* illustrate a method for providing a file-system view of email attachments.

FIG. 2 illustrates a method for providing a file-system view of email attachments. The steps outlined in a solid line are performed by an email application, and the steps outlined by a dashed line are performed by a user or a user's operating system (or otherwise performed on the client computer). Moreover, the method is illustrated in the form of a flow chart, but those skilled in the art will appreciate that the illustrated steps need not necessarily be performed in the exact order illustrated in FIG. 2.

With respect to FIG. 2, the email application appears 210 as a file system to a user's operating system. In one embodiment, this is implemented by associating a drive on the user's computer with the email application, where the operating system is provided with the name of the drive and the address of the server running the email application. Once the operating system recognizes the email application as a file system, it displays 215 a drive associated with the email application.

When the user selects 217 the drive, the operating system sends 219 a request to the email application for the contents of the drive. The operating system communicates with the email application via a protocol that enables the exchange of file information. For Windows operating systems, the WEB-DAV protocol can be used.

As stated above, the email application categorizes email attachments, in one embodiment, at least some of the highest-level categories correspond to all or some of the "fields" of the metadata. The email application maps 220 each of the highest-level categories into a folder name. In this sense, each folder is a "virtual folders" as it is a folder in name only.

Figure 3:
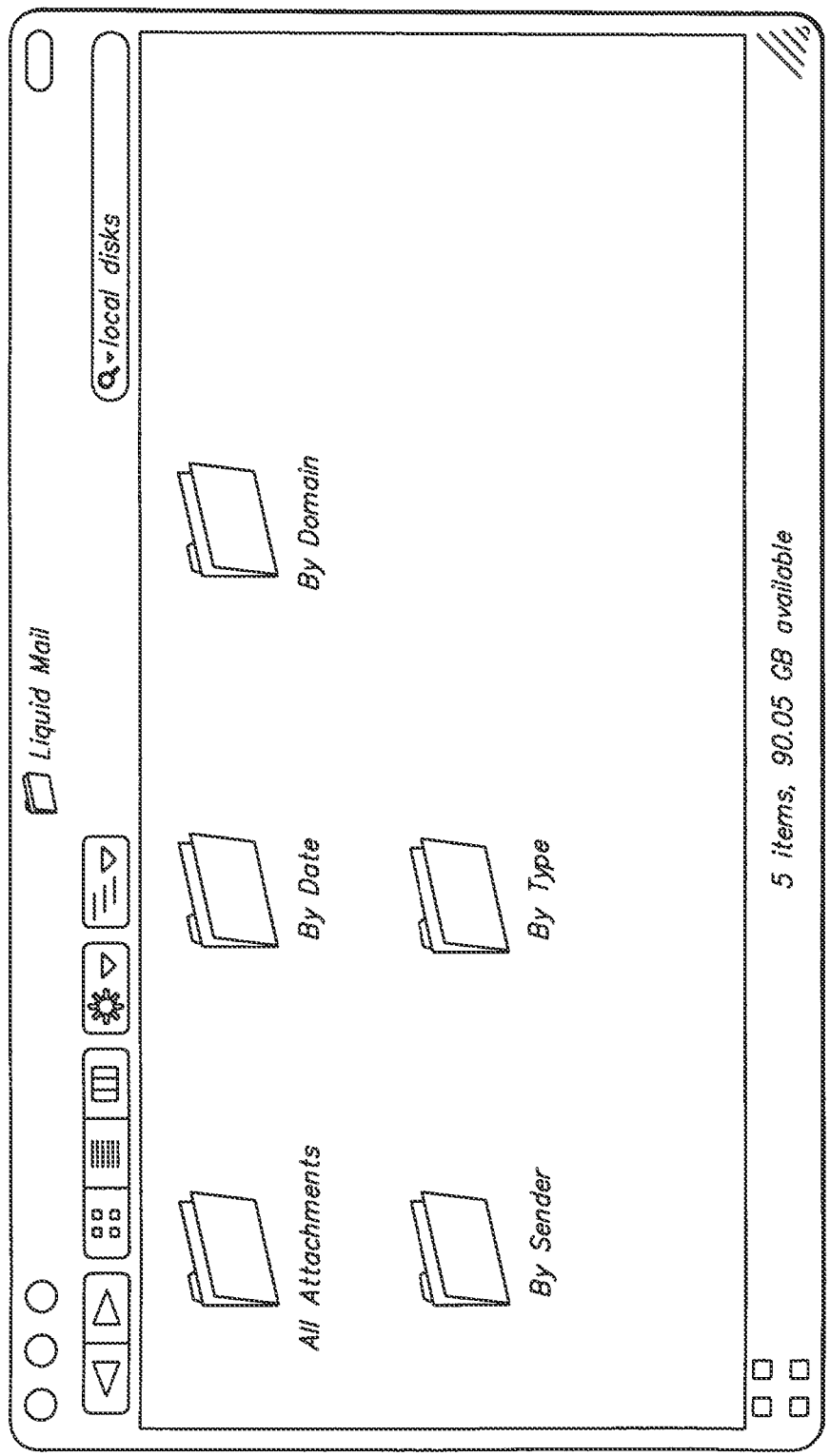
FIGS. 3-6 are example screen shots of a file-system view of email attachments.

In response to the operating system's request for the contents of the drive, the email application provides 222 such folder names to the operating system. The operating system then displays 225 the folders. FIG. 3 illustrates an example of what a user see. In this case, the user sees folders titled "By Date", "By Domain," "By Sender," "By Type," which means that, at the very least, email attachments in this example are categorized by date, by domain names associated with senders and recipients (e.g., "abccorp.com"), by sender, and by type. In the example in FIG. 3, there also is a folder titled "All Attachments," which contains all the email attachments for the user.

In response to the user opening 227 (e.g., double-clicking on) one of such folders, the operating system asks 229 the email application for the contents of such folder. The email application maps 230 opened folder name to the category to which the folder corresponds and determines 232 whether or not such category is associated with further categorization options. Further categorization options are just additional categories that further categorize the email attachments under the first-level categories. For example, if the first-level categories correspond to the fields of the metadata, the second-level categories can correspond to the terms of the metadata (see FIG. 4). Also, there can be third and fourth-level categories that correspond to the additional fields (other than the field associated with the first-level category) and the terms under such additional fields.

Figure 4:
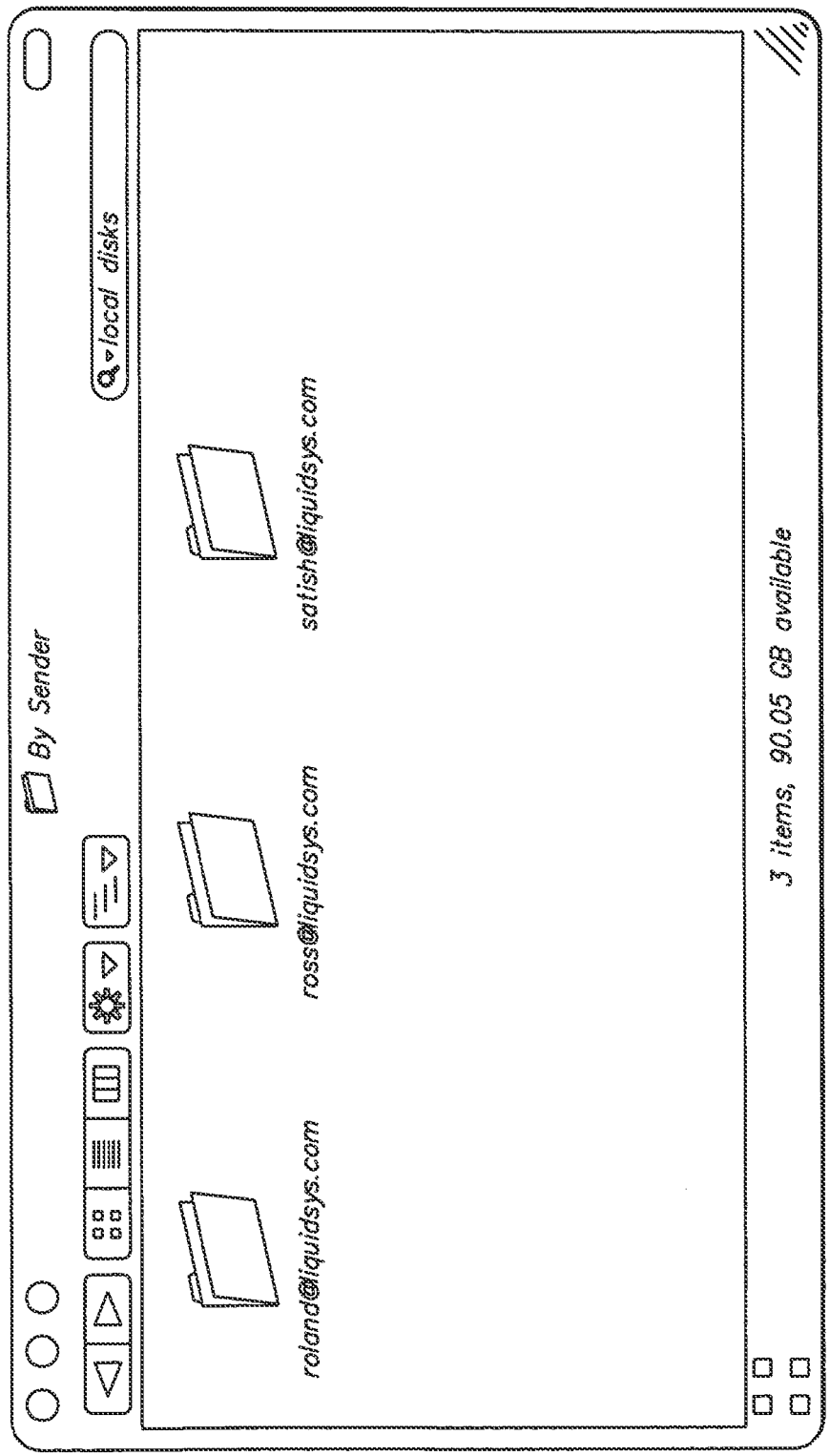
Figure 5:
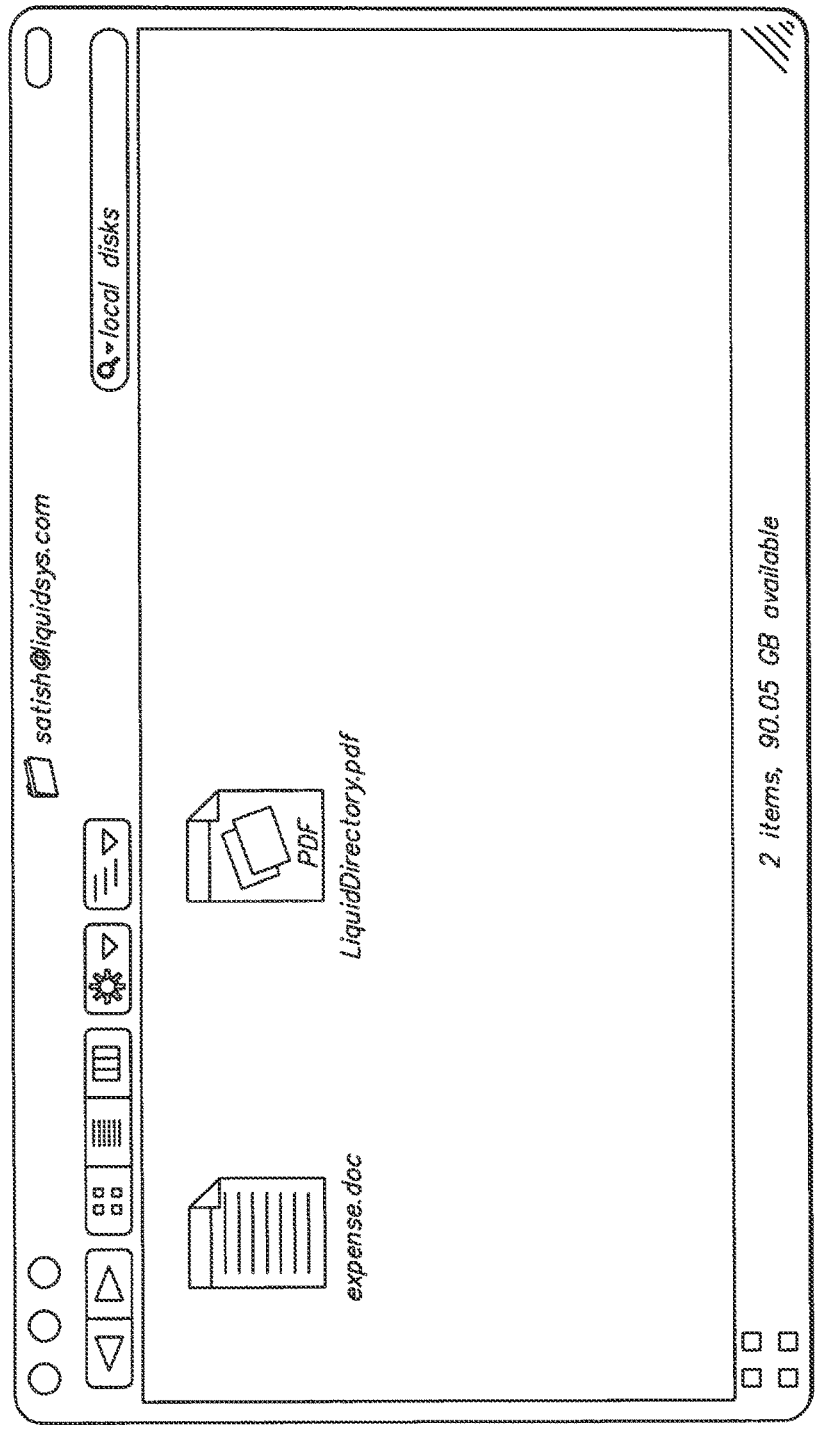
Figure 6:
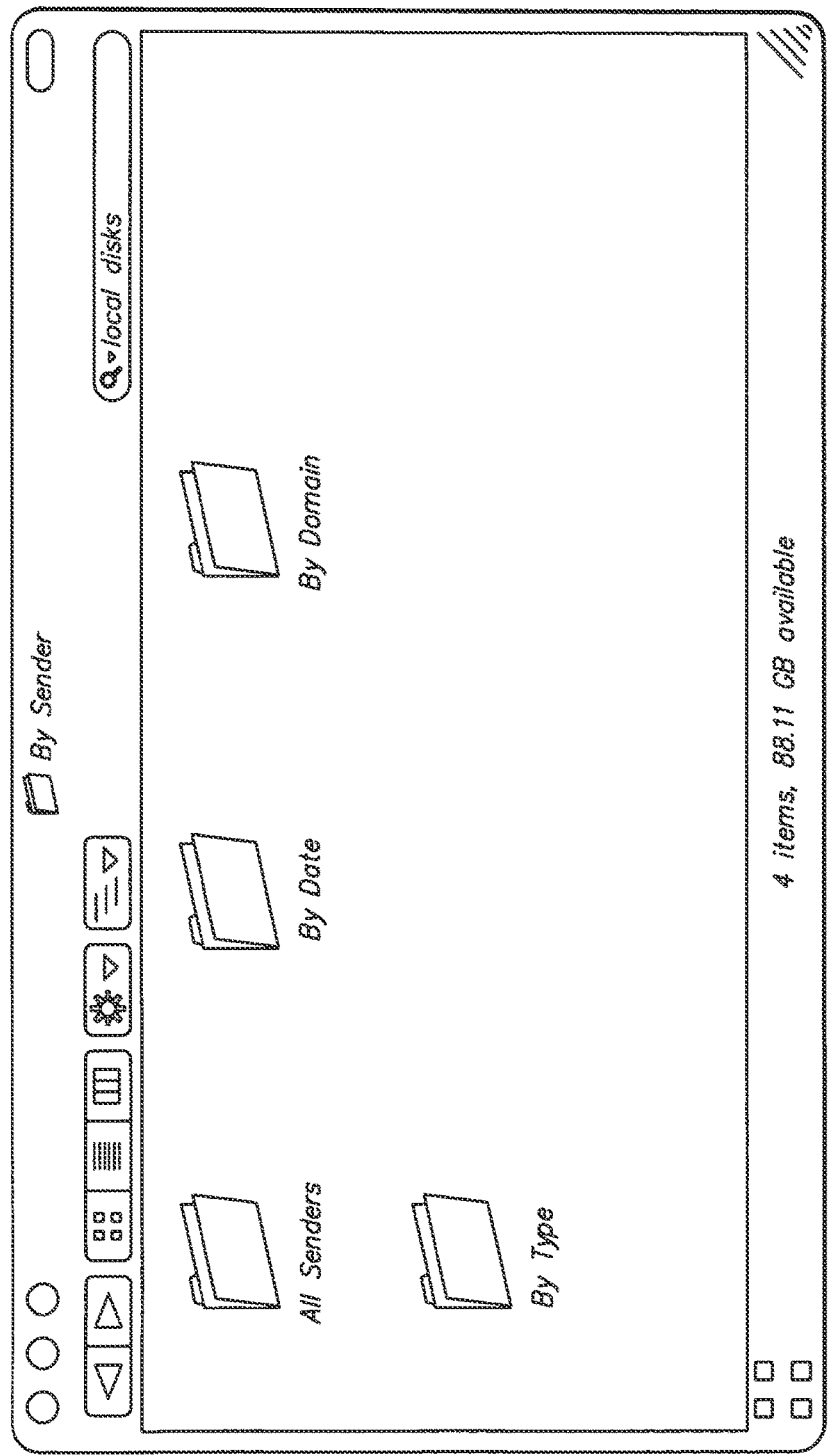

If the selected category is associated with further categorization options, the email application maps 234 each of such categorization options into a folder name and provides the folder names as the contents of the opened folder. The operating system then display 225 folders with such folder names as the contents of the opened folder. FIG. 4 illustrates an example of what a user might see if he opens the folder in FIG. 3 titled "Sender." In this example, the further categorization options are the terms associated with the metadata field "Sender." The terms are "roland@liquidsys.com," "ross@liquidsys.com," and "Satish@liquidsys.com" because the user has received attachments from "roland@liquidsys.com," "ross@liquidsys.com," and "satish@liquidsys.com" In this example, each of these folders can contain the attachments from these senders (FIG. 5), or, as illustrated in FIG. 6, they can contain further folders which further categorize the folders from that sender by date, domain, and file type. As the folders in FIG. 6 correspond to metadata fields, such folders would include subfolders that correspond to the terms of such fields.

Returning again to FIG. 2, in response to the selected category not being associated with further categorization options, the email application identifies 235 the email attachments for the user that fit under the selected category. In an embodiment where email attachments are indexed by metadata, this may include looking up the selected category in the index and retrieving the identity of the email attachment listed under such category in the index. In one embodiment, the retrieved identity information is message IDs and message part numbers assigned to the email attachments.

After identifying the relevant email attachments, the email application maps 236 each of such email attachments to a file name and sends the operating system a file directory with all such file names. In this embodiment, the files are essentially "virtual files" because the email systems only creates a name for the file it does not actually copy the email attachment and save it under the file name. The operating system 237 displays the file names as the contents of the opened folder. FIG. 5 illustrates an example of what a user might see if he opens the "Satish" folder shown in FIG. 4. In this case there is file title "expense.doc" and a file titled "LiquidDirectory.pdf"

In response to a user selecting 239 one of the displayed files in the file-system view, the operating system sends 239 the email application a request for the file, providing a file path name. The email application maps 240 the file path name to an email attachment. In one embodiment, mapping to an email attachment means mapping to a message ID and part number associated with an email attachment. The email application retrieves 242 a copy of the email attachment from storage, and it sends 242 the email attachment to the operating system.

In an alternate embodiment, instead of having virtual folders and virtual file names, the email application actually creates folders for each of the categories and makes copies of the email attachments which are stored in the applicable folders. Such an embodiment is not as storage efficient as having virtual files and folders.

3. Software Implementation

Figure 7:
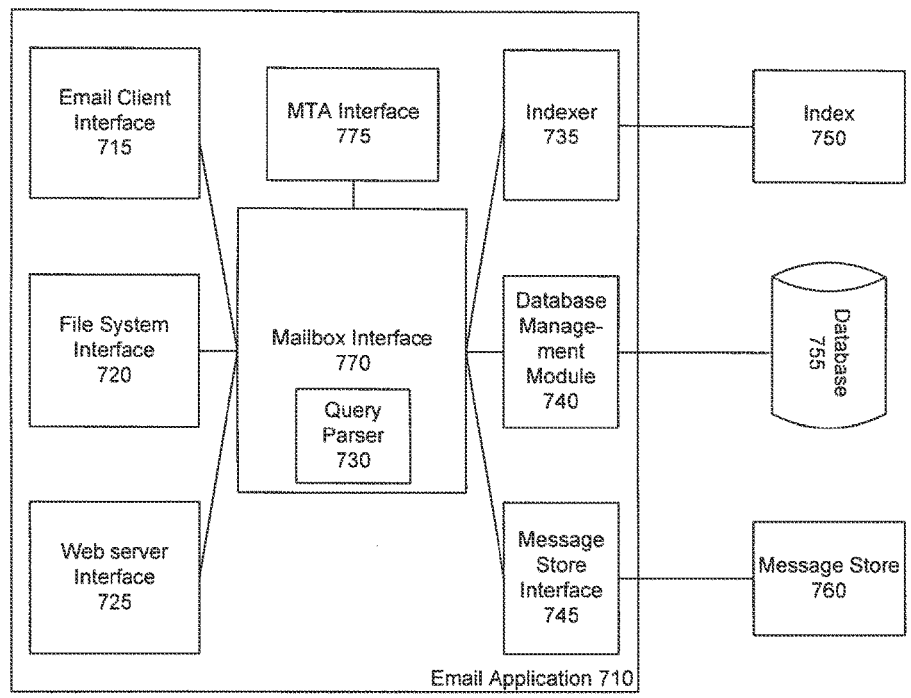
FIG. 7 is a block diagram of functional modules of an email application according to one embodiment of the present invention.

For ease of explanation, an email application for implementing the above-described methods can be thought of as divided into various functional modules, which are illustrated in FIG. 7. These modules are a Mailbox Interface 770, a Query Parser 730, an Indexer 735, a Database Management Module 740, a Message Store Interface 745, a MTA Interface 775, an Email Client Interface 715, a Web Server Interface 725, and a File System Interface 720. In one embodiment these modules are coded in Java.

Those skilled in the art will appreciate that an email application will include additional functionality not represented by the above modules (such as functionality related to security, user log in, global address lists, etc.). However, such functionality is well known in the art and a discussion of such functionality is not relevant for an understanding of the invention described herein. Moreover, those skilled in the art will appreciate that there may be many ways to implement the methods described in FIGS. 1 and 2a-b, and the software implementation described herein with respect to FIGS. 7-11 is just one example of an implementation.

The Database Management Module 740 is relational database management software, such as mySQL, for managing, storing and retrieving information in a Database 755. The Database 755 includes information about each authorized email user's mailbox that is used to generate a view of the user's mailbox. It stores a listing of the contents of a user's mailbox (with a reference to the actual storage location of the messages in the Message Store 760), and it includes mutable information about such content, such as which folder each message resides (inbox, sent items, user-created folders, etc.) or which messages have been read.

The Message Store Interface 745 is software for storing and retrieving email messages in a Message Store 760. The Message Store (often referred to as the "BLOB Store" in the industry) stores the actual email messages, including any attachments embedded within email messages. Techniques for storing and retrieving email messages, as well as storing and retrieving user-specific mailbox information to generate a view of a user's mailbox are well known in the art.

The Indexer 735 indexes email messages and email attachments based on email metadata, where the indexes are stored in the Index 750. A copy of the metadata is also stored in the Index 750. The operation of the Indexer 735 is discussed in more detail with respect to FIGS. 9-12. In an alternate embodiment, the functionality of the Indexer 735 and the Database Management Module 740 are combined, and the metadata index and user mailbox information are stored in one database.

The Email Client Interface 715 is the interface through which the email application communicates with email client software. The Email Client Interface 715 formats inbound and outbound information appropriately so that the email application can communicate with client software. In one embodiment, the email Client Interface 715 supports POP and MAP.

The Web Server Interface 725 is the interface through which the email application 710 communicates with web servers. It formats inbound and outbound information appropriately so that the email application 710 can communicate with web servers.

The File System Interface 720 is the interface though which the email application 710 communicates with external operating systems to appear as a file system to the operating systems. In one embodiment, the File System Interface 720 uses a protocol called "WEBDAV" to communication with Windows operating systems. In one implementation, the File System Interface 720 performs the mapping functionality described in FIG. 2 (e.g., steps 220, 230, 234, 236, and 240).

The MTA Interface 775 receives incoming messages for authorized users from a Mail Transfer Agent (MTA) (not shown). In one embodiment the MTA Interface 775 uses the Local Mail Transfer Protocol (LMTP) to communicate with an MTA that uses the Simple Mail Transfer Protocol (SMTP). The MTA Interface 775 forwards incoming email message to the Mailbox Interface 770.

The Mailbox Interface 770 processes incoming email messages, including parsing metadata, as described below with respect to FIG. 8. The Mailbox Interface 770 includes a Query Parser 730, which parses all requests that involve searching the Index 750 or the Database 755. It creates appropriate query trees and sends them to either the Indexer 735 or the Database Management Module 740, depending on whether or not the Index 750 or the Database 755 has the appropriate information.

The Query Parser 730 receives, and if necessary, assembles the responses to the query trees from the Indexer 735 and Database Management Module 740 and forwards it to the appropriate interface (such as interfaces 715, 720, 725) for transmittal to the requesting systems.

Figure 8:
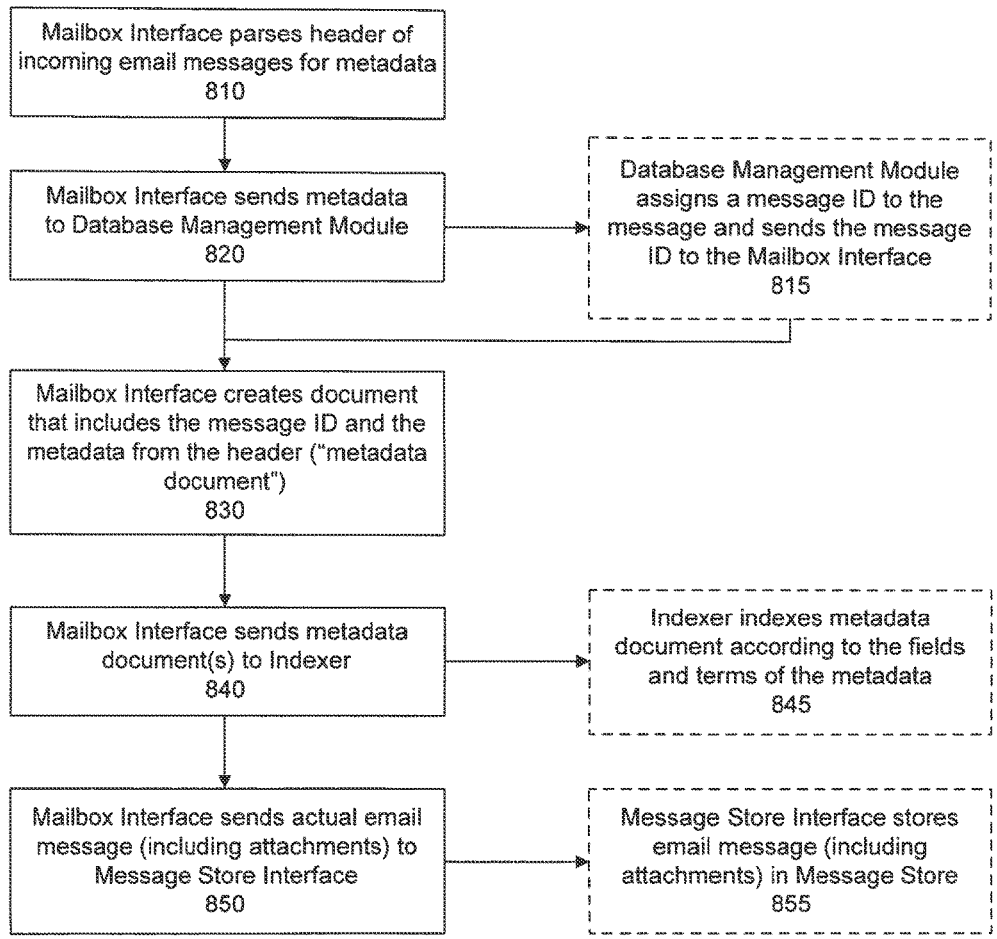
FIG. 8-12 are flow charts illustrating the operation of various functional modules in an email application according to one embodiment of the present invention.

FIG. 8 illustrates how the Mailbox Interface 770 handles incoming email messages. When the Mailbox Interface 770 receives an email message, it parses 810 the header of the message for metadata. If the email message includes an attachment, then the email header also includes metadata about the attachment. Techniques for parsing email message headers are known in the art, and, in one embodiment the Mailbox Interface 770 supports MIME.

The email application sends 820 a copy of some or all of the metadata to the Database Management Module 740, which provides 815 the Mailbox Interface 770 with a message ID for the message. It also provides part numbers for each of the attachments (if any).

For each email message and email attachment, the Mailbox Interface 770 creates 830 a document that includes the metadata from the email header and the message ID (referred to herein as the "metadata document"). Specifically, the metadata document includes a field for the message ID and a field for each of the metadata fields in the email header. The message ID field is populated with the message ID received from the Database Management Module 740, and the metadata fields are populated with the corresponding metadata terms (i.e., the value of the fields) in the email message header. Metadata documents for email attachments include all the metadata from the applicable email message in addition to the metadata related to the attachment. Metadata documents for email attachments also include the part number assigned to the email attachment.

The Mailbox interface 770 sends 840 the metadata document(s) to the Indexer 735, which then indexes 845 the metadata document according to the fields and terms of the metadata in such metadata document. Because the metadata documents correspond to email messages and email attachments, indexing the metadata documents is equivalent to indexing the email messages and email attachments. Creating a separate metadata document for each email attachment enables email attachments to be tracked separately from email messages. There is a separate index for each authorized (i.e., provisioned) user. Indexing email attachments by the metadata fields and terms is one way to categorize email attachment, but those skilled in the art will appreciate that there are other ways to categorize email attachments.

Referring again to FIG. 8, the Mailbox Interface 770 sends 850 the actual email message (including any attachments) to the Message Store Interface 745. The Message Store Interface 745 stores 855 the email message in the Message Store 760.

Figure 9:
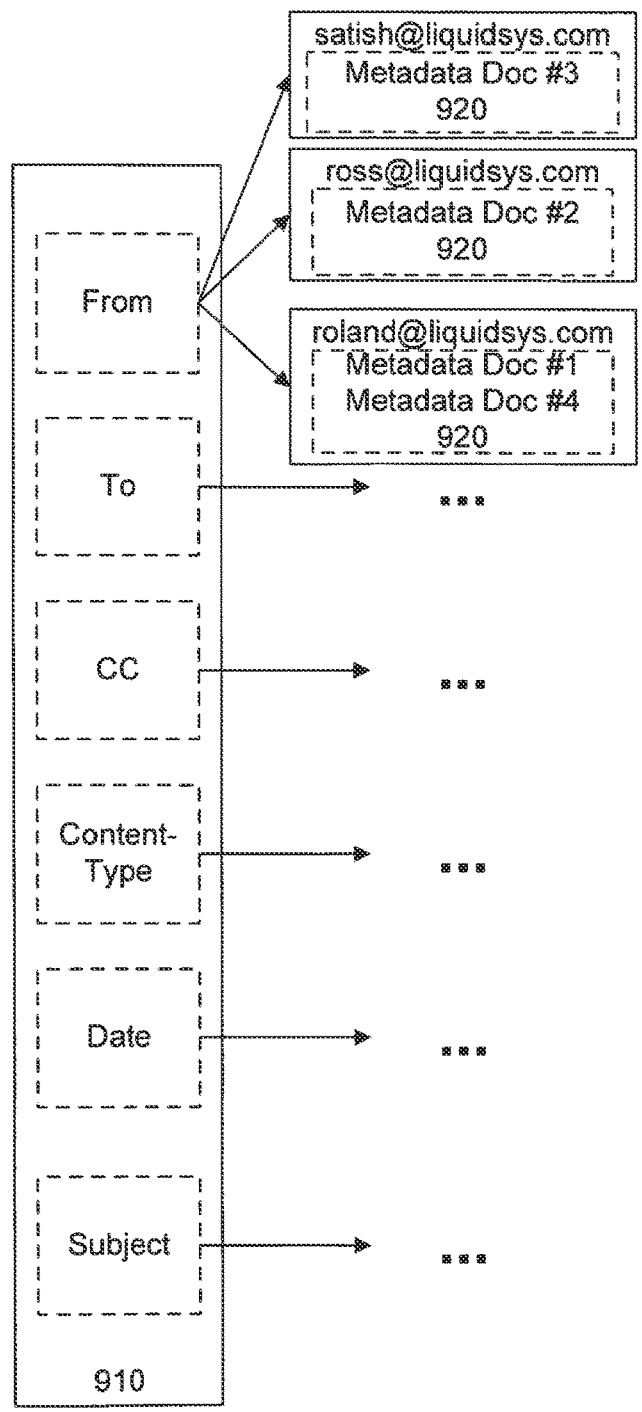

FIG. 9 illustrates an example of a representation of an index created by the Indexer 735 for email attachments received by a particular user. In this example, the top level 910 of the index consists of the "fields" of the metadata associated with email messages and email attachments. Under each field in the index are tables 920 for each of the "terms" that have been received for such field for the user. Each of the tables 920 list the metadata documents having such term, where each metadata document corresponds to an email attachment. (The dots in FIG. 9 represent other tables for the respective fields and terms).

In the example illustrated in FIG. 9, the email user has received email attachments from roland@liquidsys.com, ross@liquidsys.com, and satish@liquidsys.com, and hence "roland@liquidsys.com, ross@liquidsys.com," and "satish@liquidsys.com" are the terms under the field "From." The illustrated index indicates that email attachments #1 and #4 are from Roland, and email attachments #2 and #3 are from Ross and Satish, respectively.

Figure 10:
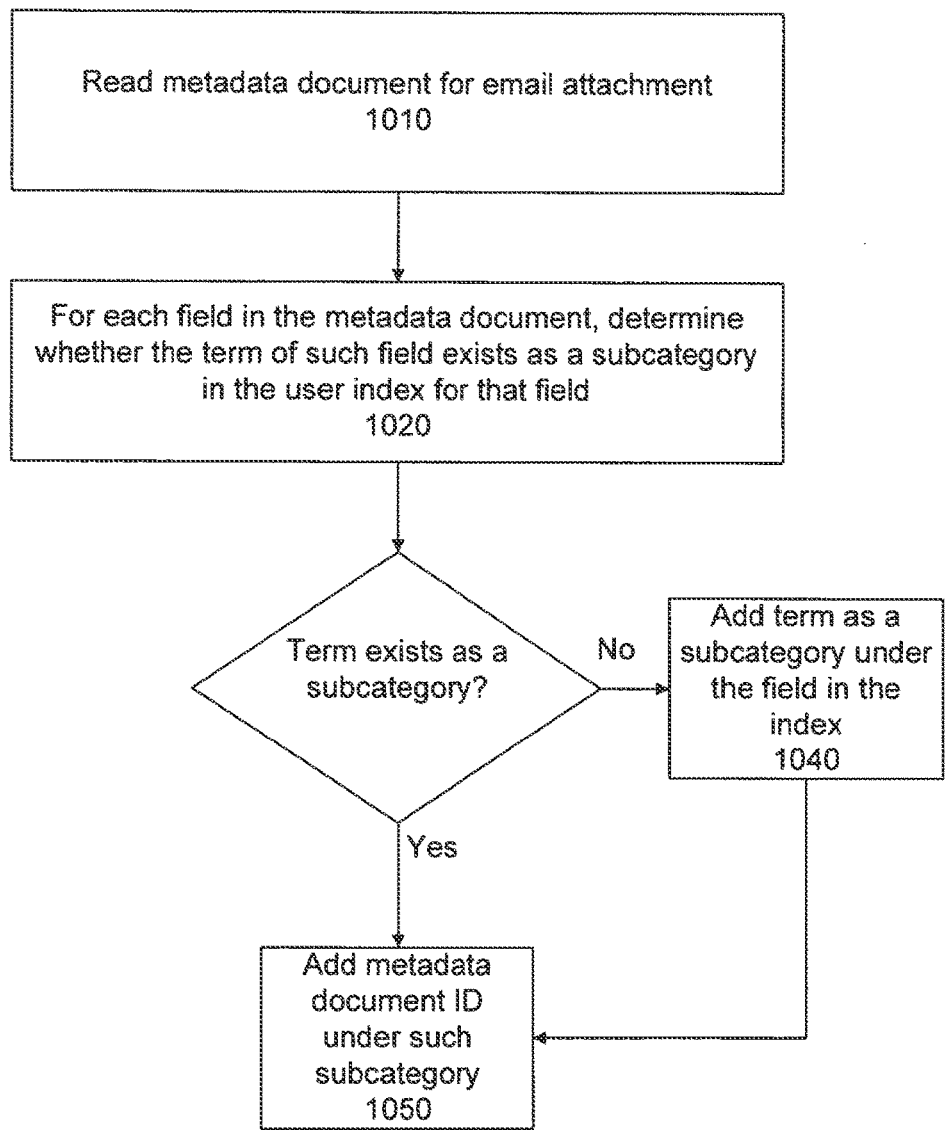

FIG. 10 illustrates one way in which the Indexer 735 can index email messages and email attachments according to the metadata fields and terms. As stated above, the Mailbox Interface 770 sends the Indexer 735 a metadata document for each email attachment and each email message, where the metadata fields in such document correspond to the first-level of the index stored for each user. For each metadata document received from the Mailbox Interface 770, the Indexer 735 reads 1010 the metadata document, and, for each field in the metadata document, it determines 1020 whether the term associated with the field exists as a subcategory under the field in the index. In one embodiment, this entails determining whether there is a table corresponding to such term under the field in the index. If the term does not exist as a subcategory under the field in the index, the Indexer adds 1040 the term as a subcategory under the field. In one embodiment, this involves adding a table corresponding to such term to the index under the field.

After the new term is added under the field, or if the term already existed under the field, then a reference to the metadata document for that email message or email attachment is added 1050 under such term. In one embodiment, this entails adding the metadata document ID to the table for such term. If the index includes additional levels with other fields and terms, this process applies to such other fields and terms.

Figure 2B:
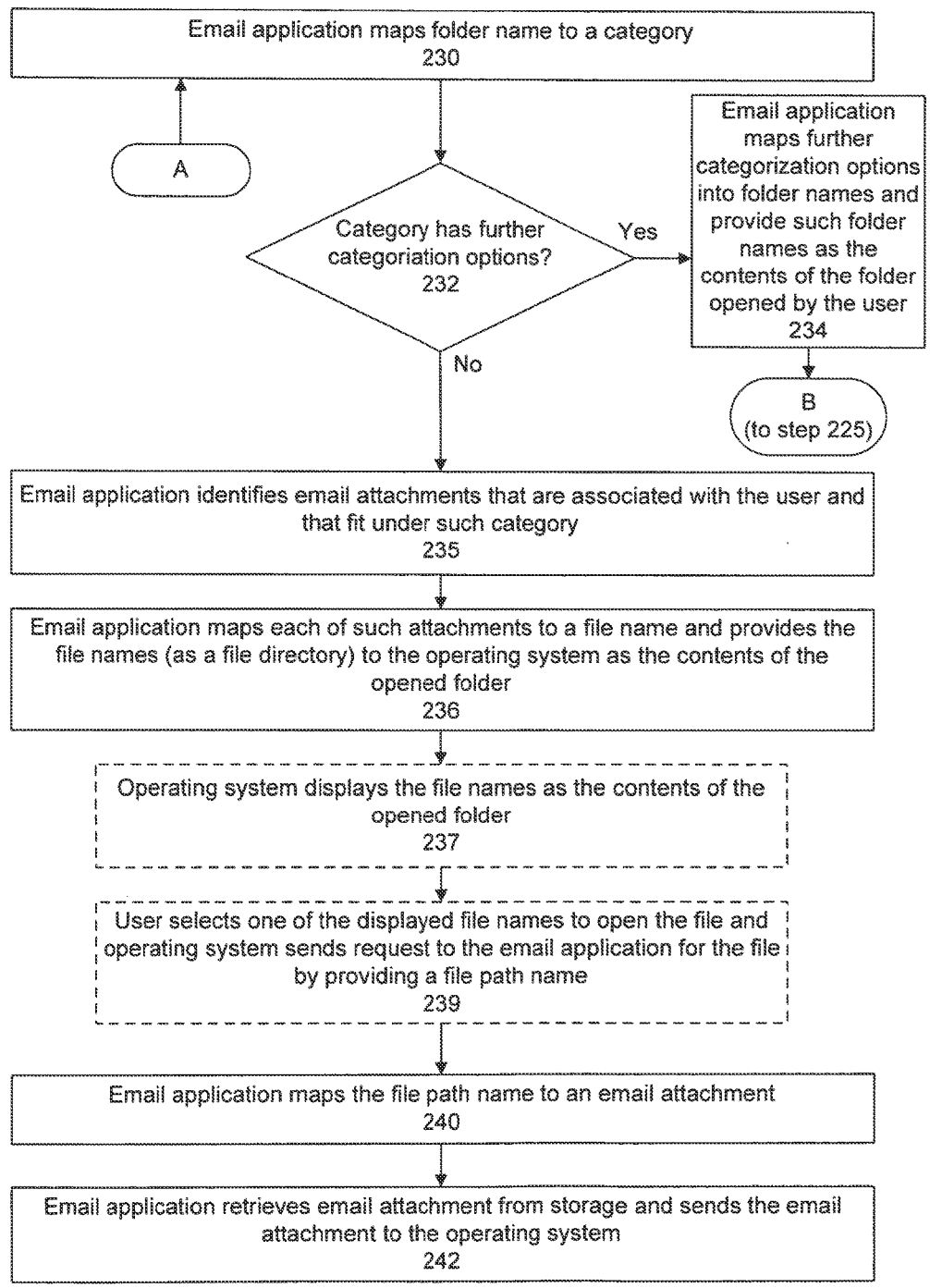
Figure 11:
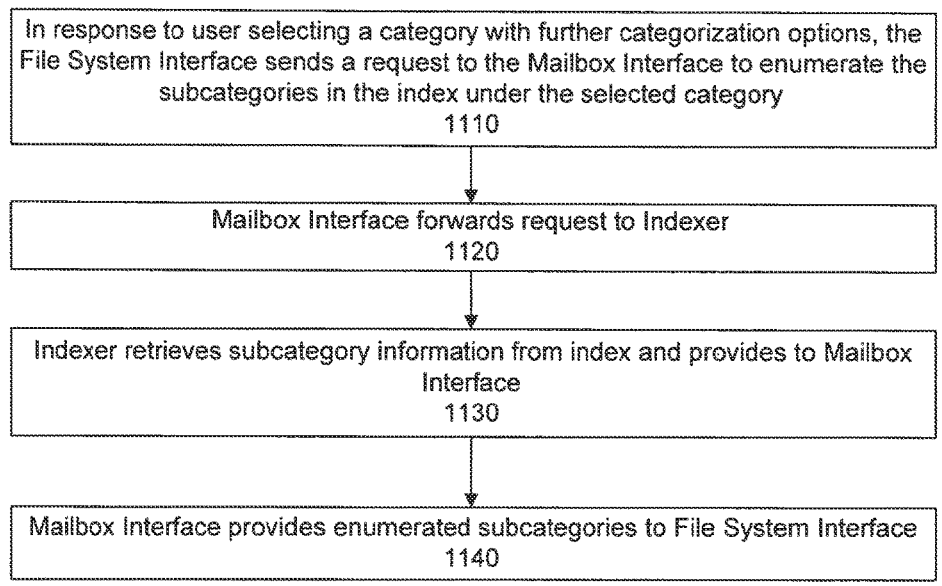

With respect to providing a file-system view of email attachments, FIG. 11 illustrates an example of how the File System Interface 720 identifies the subcategories under a category so that it can map such subcategories to folder names (see step 234 in FIG. 2*b*). In response to a user opening a folder that corresponds to a category with subcategories, the File System Interface 720 sends 1110 a request to the Mailbox Interface 770 to enumerate the subcategories. The Mailbox Interface 770 forwards 1120 the request to the Indexer 735, which retrieves 1130 the subcategory information from the Index 750 (e.g., it enumerates the terms of the index under a particular field) and sends it the Mailbox Interface 770. The Mailbox Interface 770 then provides the subcategories to the File System Interface 720.

Figure 12:
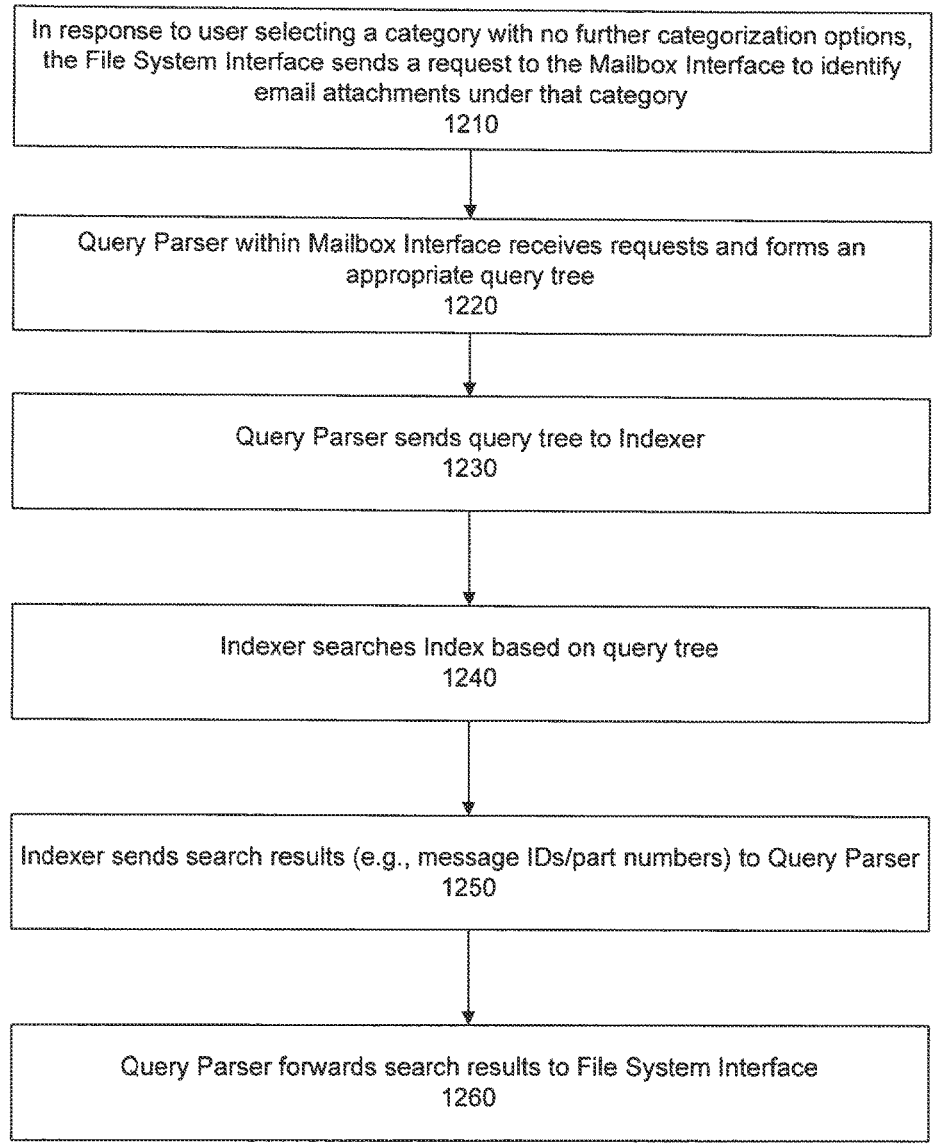

FIG. 12 illustrates an example of how the File System Interface 720 obtains the identity of email attachments under a category that has no further subcategories. When the File System Interface 720 receives a request from the operating system for the contents of a folder with no subfolders, the File System Interface 720 sends 1210 a request to the Mailbox Interface 770 to identify all the email attachments under the category corresponding to such folder. The Query Parser 730 (within the Mailbox Interface 770) receives the request and forms 1220 an appropriate query tree for the request. The Query Parser 730 sends 1230 the query tree to the Indexer 735, which uses the query tree to search 1240 the Index 750 and sends 1250 the search results to the Query Parser 730. The Query Parser 730 then forwards 1260 the search results to the File System Interface 720.

In one embodiment, the search results are message IDs and message part numbers retrieved from metadata documents satisfying the query tree in the Index 750. In this embodiment, when the File System Interface 720 maps email attachments to file names, it is mapping message IDs and corresponding part numbers to file names. When an operating system requests a particular file, the File System Interface 720 maps the file name to the message ID and part number and sends a request to the Mailbox Interface 770 for the attachment corresponding to the message ID and part number. The Mailbox Interface 770 sends the message ID and part number to the Message Store Interface 745, which retrieves the attachment corresponding to the message ID and part number from the Message Store and sends the attachment to the File System Interface 720 via the Mailbox Interface 770.

Analogous methods as those described with respect to FIGS. 2a, 2b, 11, and 12 can be performed to enable email attachments to be viewed through other external systems. For instance, the Web Server Interface 725 can perform similar functions as the File System Interface 720 to enable email attachments to be viewed through a web browser.

4. User-Created Categories

Email messages and email attachments can be categorized by user-created categories instead or in addition to categories based on the metadata terms and fields. User-created categories can be "tags" that a user has associated with an email message. Techniques for enabling email messages to be tagged are well known in the art.

In one embodiment, each tag is assigned a unique ID, and email attachments (or metadata information relating to such email attachments) are indexed or stored in a table appropriately under the unique IDs. Such an index or table can be store in either Index 750 or Database 755, and the Query Parser 730 can direct requests to the Indexer 735 or the Database Management Module 740 appropriately. In the event that a search request from the File System Interface 720 or other external system interface requires information from both the Index and the Database Management Module 740, the Query Parser 730 will divide up the request appropriately between the Indexer 735 and Database Management Module 740. The Query Parser 730 will then filter or merge the search results from the Indexer 735 and Database Management Module 740 as necessary to comply with the constraints of the search request.

5. Conclusion

As will be understood by those familiar with the art, the invention may be embodied in other specific forms without departing from the spirit or essential characteristics thereof. Accordingly, the disclosure of the present invention is intended to be illustrative and not limiting of the invention.

The invention claimed is:

1. A method for enabling a view of categorized email attachments using a system external to an email application that stores and processes emails, the method comprising:
   for each of a plurality of emails received by the email application, each email comprising an email attachment:
       separately storing the email attachment from the corresponding email in a message store; and
       categorizing, in an email system, the email attachment separately from the email as belonging to one or more categories of a plurality of categories, wherein the categorizing of the email attachment includes parsing metadata from the email header of the corresponding email and using the metadata to categorize the email attachment based on categories corresponding to one or more metadata fields;
   providing, to the external system, information that identifies each category in the email system determined for each of the categorized email attachments, wherein the external system is associated with a user interface configured to present the categories for selection;
   receiving a user selection of a category presented in the user interface, the category corresponding to a category determined for one or more categorized email attachments;
   in response to a request for contents of a user selected category presented in the user interface associated with the external system, providing the external system contents of the selected category for display to the user in the user interface, wherein the provided contents include a listing of each separately stored email attachment, independent from the plurality of emails, categorized as belonging to the selected category; and
   in response to a user selection of a particular email attachment listed for the selected category, providing the external system with the particular email attachment.

2. The method of claim 1, wherein providing the external system contents of the selected category comprises:
   identifying one or more email attachments under the selected category;
   mapping the one or more email attachments associated with the selected category to file names, and
   display the file names as contents of the selected category.

3. The method of claim 1, wherein categorizing the email attachment separately from the email comprises:
   generating a metadata document for the email attachment using the parsed metadata associated with the email and the email attachment and a message identifier; and
   categorizing the email attachment and the email in separate categories using an indexer that indexes the metadata document according to fields and terms of metadata in the metadata document.

4. The method of claim 1, wherein providing the external system contents of the selected category comprises providing files that correspond to each of the stored email attachments associated with the selected category.

5. The method of claim 4, wherein the selected category corresponds to metadata associated with all email attachments in the message store.

6. The method of claim 1, wherein providing the external system contents of the selected category comprises providing one or more sub-categories associated with the selected category.

7. The method of claim 6, wherein the sub-categories associated with a selected category comprise values of a corresponding metadata field of the email messages associated with the selected category.

8. The method of claim 1, further comprising, based on the email attachment, creating categories upon which to categorize the email attachment and the email separately in the email system.

9. A system comprising:
a message store for storing email attachments; and
a server comprising a processor programmed to:
for each of a plurality of emails received, each email comprising an email attachment:
separately store the email attachment from the corresponding email in the message store; and
categorize, in one or more categories, the email attachment separately from the email as belonging to one or more categories of a plurality of categories, wherein the categorizing of the email attachment includes parsing metadata from the email header of the corresponding email and using the metadata to categorize the email attachment based on categories corresponding to one or more metadata fields;
provide, to an external system, information that identifies each of the one or more categories determined for each of the categorized email attachments, wherein the external system is associated with a user interface configured to present the categories for selection;
receive a user selection of a category presented in the user interface, the category corresponding to a category determined for one or more categorized email attachments;
in response to a request for contents of a user selected category, of the one or more categories, presented in a user interface associated with the external system, provide the external system contents of the selected category for display to the user in the user interface, wherein the provided contents include a listing of each separately stored email attachment, independent from the plurality of emails, categorized as belonging to the selected category; and
in response to a user selection of a particular email attachment listed for the selected category, provide the external system with the particular email attachment.

10. The system of claim 9, wherein providing the external system contents of the selected category comprises:
identifying one or more email attachments under the selected category;
mapping the one or more email attachments associated with the selected category to file names, and
display the file names as contents of the selected category.

11. The system of claim 9, wherein categorizing the email attachment separately from the email comprises:
generating a metadata document for the email attachment using the parsed metadata associated with the email and the email attachment; and
categorizing the email attachment and the email in separate categories using an indexer that indexes the metadata document according to fields and terms of metadata in the metadata document.

12. The system of claim 11, wherein providing the external system contents of the selected category comprises providing files that correspond to each of the stored email attachments associated with the selected category.

13. The system of claim 12, wherein the selected category corresponds to metadata associated with all email attachments in the message store.

14. The system of claim 9, wherein the processor is further programmed to, based on the email attachment, create categories upon which to categorize the email attachment and the email separately in the email system.

15. A non-transitory computer-readable storage medium comprising computer-executable instructions thereon, that when executed by one or more processors, cause the one or more processors to perform the steps of:
for each of a plurality of emails received, each email comprising an email attachment:
separately storing the email attachment from the corresponding email in a message store; and
categorizing the email attachment separately from the email as belonging to one or more categories of a plurality of categories, wherein the categorizing of the email attachment includes parsing metadata from the email header of the corresponding email and using the metadata to categorize the email attachment based on categories corresponding to one or more metadata fields;
providing, to an external system, information that identifies each category determined for each of the categorized email attachments, wherein the external system is associated with a user interface configured to present the categories for selection;
receiving a user selection of a category presented in the user interface, the category corresponding to a category determined for one or more categorized email attachments;
in response to a request for contents of a user selected category presented in a user interface associated with the external system, providing the external system contents of the selected category for display to the user in the user interface, wherein the provided contents include a listing of each separately stored email attachment, independent from the plurality of emails, categorized as belonging to the selected category; and
in response to a user selection of a particular email attachment listed for the selected category, providing the external system with the particular email attachment.

16. The non-transitory computer-readable storage medium of claim 15, wherein providing the external system contents of the selected category comprises:
identifying one or more email attachments under the selected category;
mapping the one or more email attachments associated with the selected category to file names, and
display the file names as contents of the selected category.

17. The non-transitory computer-readable storage medium of claim 15, wherein categorizing the email attachment separately from the email comprises:
generating a metadata document for the email attachment using the parsed metadata associated with the email and the email attachment; and
categorizing the email attachment and the email in separate categories using an indexer that indexes the metadata document according to fields and terms of metadata in the metadata document.

18. The non-transitory computer-readable storage medium of claim 17, wherein providing the external system contents of the selected category comprises providing files that correspond to each of the stored email attachments associated with the selected category.

19. The non-transitory computer-readable storage medium of claim 18, wherein the one or more processors further perform the step of, based on the email attachment, creating categories upon which to categorize the email attachment and the email separately in the email system.

* * * * *